United States Patent [19]

Hishinuma et al.

[11] 3,981,972

[45] Sept. 21, 1976

[54] METHOD FOR DESULFURIZING FLUE GAS BY ACTIVE CARBON SUSPENSION

[75] Inventors: Yukio Hishinuma; Zensuke Tamura, both of Hitachi, Japan

[73] Assignee: Hitachi, Ltd., Japan

[22] Filed: Aug. 15, 1973

[21] Appl. No.: 388,462

[30] Foreign Application Priority Data

Aug. 25, 1972 Japan................................ 47-84519

[52] U.S. Cl................................. 423/244; 423/522
[51] Int. Cl.² ...................... C01B 17/00; B01J 8/00
[58] Field of Search ........................... 423/242–244, 423/522

[56] References Cited
UNITED STATES PATENTS 3,374,061  3/1968  Topsoe et al. ...................... 423/522

FOREIGN PATENTS OR APPLICATIONS 1,052,188  12/1966  United Kingdom................. 423/522
1,098,557  1/1968  United Kingdom................. 423/244
1,209,002  10/1970  United Kingdom................. 423/522

Primary Examiner—Oscar R. Vertiz
Assistant Examiner—Gregory A. Heller
Attorney, Agent, or Firm—Craig & Antonelli

[57] ABSTRACT

An active carbon suspension obtained by mixing particles of active carbon with water, and flue gas containing sulfur dioxide are introduced into a desulfurization column, wherein the flue gas is contacted with the active carbon suspension. Sulfur dioxide is absorbed into the active carbon suspension, thereby purifying the flue gas. On the other hand, the absorbed sulfur dioxide is converted to sulfuric acid by a catalytic action of the active carbon in the desulfurization column, and the resulting sulfuric acid is separated from the active carbon suspension.

24 Claims, 5 Drawing Figures

METHOD FOR DESULFURIZING FLUE GAS BY ACTIVE CARBON SUSPENSION

BACKGROUND OF THE INVENTION

This invention relates to a method for desulfurizing flue gas by a wet process, which comprises removing sulfur dioxide from a flue gas containing sulfur dioxide, which will be hereinafter referred to merely as "flue gas".

Removal of noxious materials from a flue gas discharged from various combustion equipments is an important problem also for preventing atmospheric pollution. Above all, the removal of sulfur dioxide is especially important. Construction of steam power station based on firing of fuel oil is now only permitted on a condition of complete removal of sulfur dioxide from flue gas to the allowable concentration, and therefore quite depends upon an efficient system for removing sulfur dioxide from the flue gas. If such an efficient system is unavailable, there would be a problem of shortage in power supply in the future.

Methods for removing sulfur dioxide from flue gas have been so far studied in every relevant field, and are now classified into two major groups, that is, a dry desulfurization process and wet desulfurization process. Typical of the dry desulfurization process is an active carbon adsorption process. According to the active carbon adsorption process, flue gas is at first passed through a column filled with active carbon thereby to adsorb sulfur dioxide from the flue gas onto the active carbon and purify the flue gas. For reuse of the active carbon, the passage of the flue gas through the column is periodically discontinued, and instead water is passed through the column to wash out sulfur dioxide adsorbed on the active carbon with water. However, with an increase in flow rate of the flue gas to be treated, the necessary amount of active carbon will be increased, and consequently a capacity of the equipment for treating the flue gas will be disadvantageously increased. Furthermore, regeneration of the active carbon is a problem. Therefore, the wet desulfurization process is now in full glare of attention.

In the wet desulfurization process, various methods have been proposed on the basis of difference in the kinds of washing solution for absorbing sulfur dioxide contained in the flue gas. One is a method for washing flue gas with water or sea water, where sulfites are formed in the washing solution after the absorption of sulfur dioxide, but the washing solution is thrown away into river or sea as such on account of a low concentration of sulfite. Under conditions of 0.1% sulfur dioxide concentration of a flue gas, and a flue gas temperature of 50°C, solubility of sulfur dioxide in water is 0.27 g/1000 g. To completely remove sulfur dioxide from 1,000 Nm$^3$/hr of flue gas under these conditions, a large amount, that is, 11 tons, of water is necessary. The lower the sulfur dioxide concentration of the flue gas or the higher the temperature at contact of the flue gas with the washing solution, the lower the solubility of sulfur dioxide in the washing solution. That is, still larger amount of the washing solution is necessary. The presence of sulfites in water and sea water gives an unfavorable influence upon living organisms in water and sea water, for example, through reduction in oxygen dissolved in water and sea water. Therefore, it is necessary to prohibit discarding into river and sea the washing solution containing sulfites, resulting from the purification of the flue gas, even if the sulfite concentration is low.

Another is a method based on the use of an aqueous alkali solution as a washing solution. The alkali solution to be used includes a sodium hydroxide (NaOH) solution, ammonia (NH$_4$OH) solution, sodium sulfite (Na$_2$SO$_3$) solution, potassium sulfite (K$_2$SO$_3$) solution, a suspension of calcium carbonate (CaCO$_3$) and calcium hydroxide Ca(OH)$_2$, etc. Sulfur dioxide of the flue gas is absorbed into a washing solution through the contact of the flue gas with the washing solution, and sulfites or sulfates are formed thereby, depending upon the kind of the washing solution. Generally speaking, disadvantages of this method are the use of expensive alkali agent and recovery of less useful sulfites and sulfates. That is, there are problems in the effective utilization of a large amount of by-products and making the washing solution hazardless for the discarding. Above all, the method based on the use of the calcium carbonate suspension as the washing solution is economical and most useful, because calcium carbonate itself is available everywhere and gypsum (CaSO$_4$) can be obtained as a by-product. However, its disadvantage is that its conversion is low and the effective by-product is hard to obtain. Recently, a process comprising absorbing sulfur dioxide into a washing solution containing a metallic catalyst, and recovering sulfur dioxide as sulfuric acid has been proposed. However, since the catalyst is dissolved in the sulfuric acid, the washing solution to be recovered is contaminated with the catalyst, or the catalyst must be always supplemented. In all of the wet desulfurization processes, all of sulfur dioxide cannot be converted to stable sulfates only through the contact of the flue gas with the washing solution, though several percentages of oxygen is contained in the flue gas, and most of sulfur dioxide is converted only to the sulfites. To convert the sulfites to the sulfates, it is necessary to provide an additional oxidation column for promoting the oxidation with supplemental air.

SUMMARY OF THE INVENTION

An object of the present invention is to provide a simple and effective method for desulfurizing flue gas.

Another object of the present invention is to provide purification of flue gas through contact of the flue gas with a suspension prepared by mixing an aqueous washing solution with particles of active carbon, which will be hereinafter referred to merely as "active carbon suspension".

Other object of the present invention is to provide purification of flue gas through contact of flue gas with the active carbon suspension, while circulating the active carbon suspension.

Still other object of the present invention is to provide formation of a liquid containing sulfate ions (SO$_4^{--}$) such as sulfuric acid, sulfates, etc. in a zone of the contact of flue gas with active carbon suspension.

Further object of the present invention is to provide control of percent desulfurization by adjusting a concentration of liquid containing sulfate ions in the active carbon suspension.

Still further object of the present invention is to obtain an effective active carbon suspension by mixing an appropriate amount of particles of active carbon into an aqueous washing solution.

Still further object of the present invention is to provide a method for efficiently desulfurizing flue gas by properly selecting particle sizes of active carbon to be mixed in the aqueous washing solution.

The present invention is characterized by contacting flue gas with an active carbon suspension prepared by mixing particles of active carbon into an aqueous washing solution, thereby absorbing sulfur dioxide contained in the flue gas into the active carbon suspension and effectively purifying the flue gas.

DESCRIPTION OF THE PREFERRED EMBODIMENT

According to the present invention, flue gas is simply and effectively purified by contacting flue gas containing sulfur dioxide with an active carbon suspension prepared by mixing particles of active carbon into an aqueous washing solution. That is, sulfur dioxide absorbed in the active carbon suspension is efficiently oxidized to solution containing stable sulfate ions by utilizing the particles of active carbon as an oxidation catalyst, and water, sea water and aqueous alkali solutions (sodium hydroxide solution, ammonia solution, etc.) are used as the aqueous washing solution.

Principle of the present method for desulfurizing flue gas based on the utilization of oxidation catalytic action of particles of said active carbon will be explained below by way of experimental examples, using water as the aqueous washing solution. The results are shown in FIGS. 1 to 4.

Water was placed in a reactor vessel, and water-saturated combustion flue gas containing 0.1% sulfur dioxide and 6% oxygen at a temperature of 55°C was bubbled through the water. Initial percent desulfurization was as low as about 1%, and the percent desulfurization was reduced to zero after 5 minutes from the start of flue gas passage. No change was seen thereafter in the percent desulfurization. Water remained in the reactor vessel, and there was no water input from the outside or output to the outside. About 10% by weight of active carbon in particle sizes of 7.4 to 11.2 mm was mixed into water, based on the water, and experiment was conducted under the same conditions as above. By mixing of the active carbon into water, the initial percent desulfurization was elevated to about 5%, and the percent desulfurization was not reduced to zero even after 5 minutes from the passage of the flue gas, and could be maintained almost at 5% even after 10 hours.

Further, the active carbon was pulverized to particle sizes of 0.14 to 0.26 mm, and about 10% by weight of the pulverized active carbon was mixed in water, based on the water. Then, experiment was conducted to remove sulfur dioxide from the flue gas under the same conditions as above. The percent desulfurization was further increased, and 100% desulfurization was obtained in the initial state.

With continued passage of the flue gas, the percent desulfurization was gradually lowered, but could be maintained at 70% even after 50 hours. These results are plotted by a full line in FIG. 1. As plotted by a dotted line in FIG. 1, the sulfuric acid concentration of water in the reactor vessel was increased from the initial zero % to 18.2% after 50 hours, when particles of active carbon having particle sizes of 0.14 to 0.26 mm were mixed into water. These experimental results clearly show that the active carbon suspension has a good absorbability towards sulfur dioxide, as compared with water. It is the reason that the sulfur dioxide absorbed in the active carbon suspension is continuously converted to sulfuric acid. That is to say, the absorbed sulfur dioxide is oxidized to sulfur trioxide, which is then hydrated to sulfuric acid. That is, the active carbon suspension can further absorb sulfur dioxide by the amount corresponding to the reduction of the sulfur dioxide contained in the active carbon suspension. The afore-mentioned phenomena can be explained also by the fact that the amount of sulfuric acid formed in the active carbon suspension almost completely accords with the amount of sulfur dioxide absorbed in the active carbon suspension. The active carbon suspension can continuously form sulfuric acid, as will be explained below. The active carbon suspension absorbs sulfur dioxide from the flue gas. The absorbed sulfur dioxide is diffused through the suspension and fixed onto the surfaces of particles of active carbon. On the surfaces of particles of active carbon, sulfur dioxide is oxidized to sulfur trioxide, which is further hydrated to sulfuric acid. The resulting sulfuric acid is then diffused into the suspension from the surfaces of the particles of active carbon.

Figure 1:
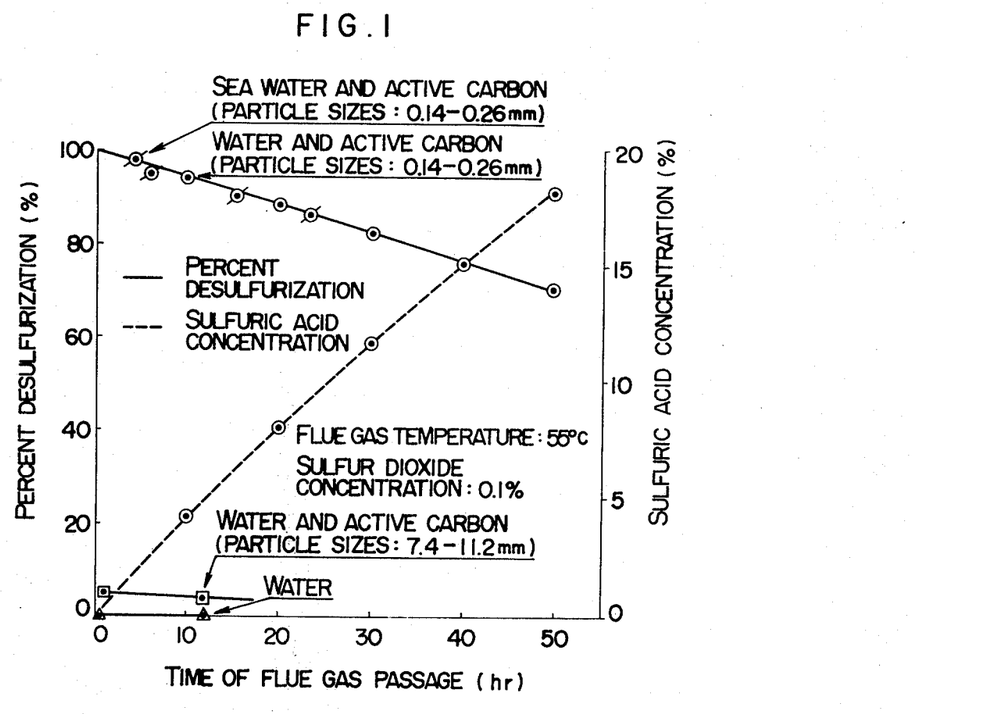
FIG. 1 is a characteristic diagram showing percent desulfurizations in active carbon suspensions and concentrations of sulfuric acid formed in the active carbon suspensions.
Figure 2:
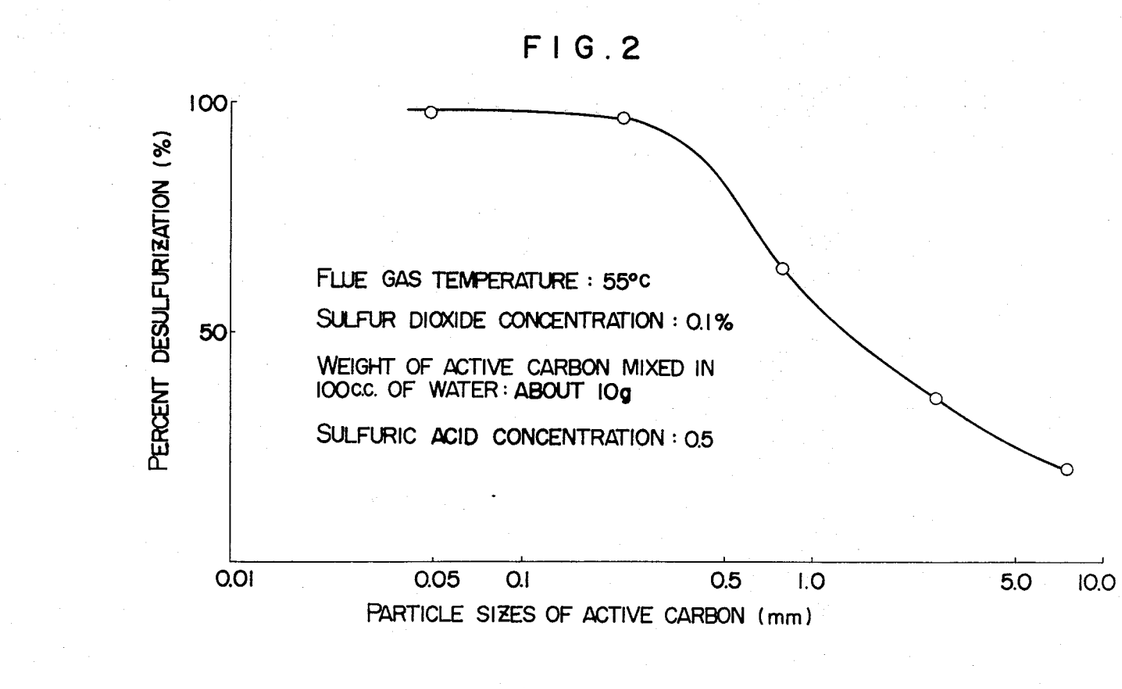
FIG. 2 is a characteristic diagram showing changes in the present desulfurization due to differences in the particle sizes of the active carbon in the active carbon suspensions.

As mentioned above, the percent desulfurization depends upon the particle sizes of the particles of active carbon. As shown in FIG. 2, the percent desulfurization increases with the reduction in particle sizes of active carbon. When the particle sizes of active carbon are reduced to about 0.37 mm or less, the percent desulfurization exceeds 90%, and when the particle sizes are 0.22 mm or less, the percent desulfurization can be maintained almost constant. Thus, the preferable particle sizes are about 0.37 mm or less.

Figure 3:
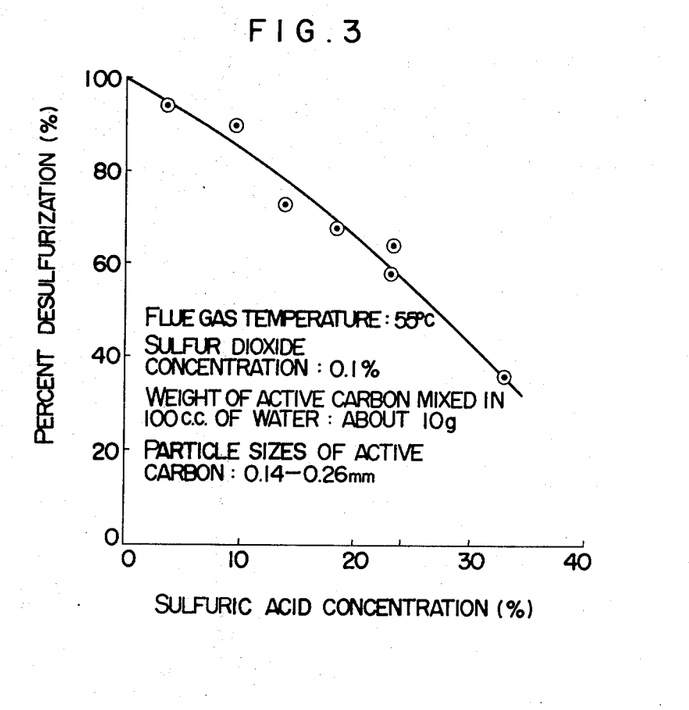
FIG. 3 is a characteristic diagram showing relations between the concentration of sulfuric acid formed in the active carbon suspensions and the percent desulfurization.

On the other hand, the percent desulfurization is gradually lowered with time during the passage of flue gas even in the active carbon suspension containing particles of active carbon having particle sizes of 0.14 to 0.26 mm. The percent desulfurization and the concentration of sulfuric acid in the suspension are in a relation of almost 1 : 1, as shown in FIG. 3, and the percent desulfurization is lowered with an increase in the sulfuric acid concentration. The aforementioned phenomena can be explained also by the fact that the percent desulfurizations obtained by preparing sulfuric acid solutions of a predetermined concentrations, mixing the solutions with an equal amount of particles of active carbon, and passing the flue gas through the solutions completely accord with the percent desulfurizations at the corresponding sulfuric acid concentrations obtained by passing flue gas through an active carbon suspension at zero sulfuric acid concentration for a long time.

Figure 4:
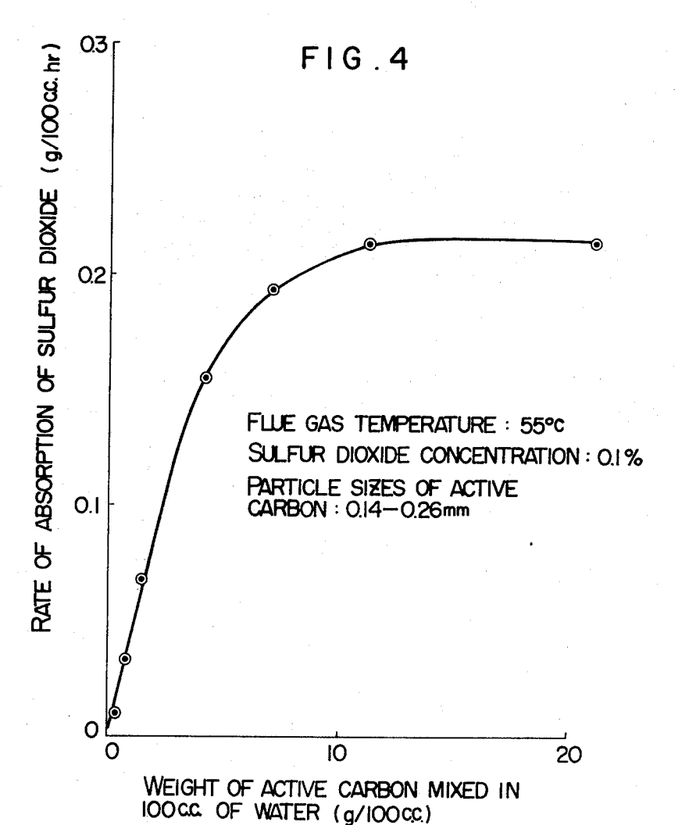
FIG. 4 is a characteristic diagram showing relations between the concentrations of active carbon in the active carbon suspension and rate of absorption of sulfur dioxide to be absorbed in the active carbon suspension.

There is such a tendency that the absorption rate of an active carbon suspension towards sulfur dioxide is increased with an increase in a mixing ratio of the weight of the particles of active carbon to the volume of water, but the absorption rate starts to be lowered when the mixing ratio reaches a specific value. As shown in FIG. 4, a limit value of the mixing ratio is 20 g of the particles of active carbon per 100 cc of water. That is, even if the mixing ratio is increased over said limit value, the absorption rate of the active carbon suspension towards sulfur dioxide is not increased, but is kept constant. That is, a solubility of sulfur dioxide in the active carbon suspension is at a saturation. Similar tendency appears even if the particle sizes of particles of active carbon are changed.

The active carbon used in the foregoing experiments was prepared in the following manner. Bituminous coal was dry distilled at a low temperature and activated with steam at 900° to 1,000°C. The resulting granulated active carbon having micropores, 5 to 20 A in pore radius, was pulverized, and used as the active carbon. However, the granulated active carbon is not always necessary, but pulverized coal can be used so long as it has a sufficient strength.

Generally, the active carbon consists of carbon, and is classified into two groups according to the kind of the raw materials. One is a group of active carbon prepared from vegetable raw materials such as wood, nut shells, etc. and another is a group of mineral raw materials such as coal, petroleum cokes, etc. Desulfurization capacities of some of these active carbons were investigated by the present inventors, and the results are given below, on the basis of the desulfurization capacity of the active carbon of coal origin as 100%.

| Kind of active carbon | Desulfurization capacity |
|---|---|
| Active carbon of coal origin | 100 % |
| Active carbon of wood origin | 95 % |
| Active carbon of nut shell origin | 85 % |
| Active carbon for water purification | 68 % |

The afore-mentioned desulfurization capacities were determined under the following experimental conditions: In reactor vessels, respective active carbon suspensions, each containing the respective active carbon having particle sizes of 0.14 to 0.26 mm in water was filled. The mixing ratio of the particles of active carbon to water was 10% by weight per volume of water. Temperature of flue gas bubbled through each active carbon suspension at a space velocity of 1,000 1/1·hr was 55°C, and the flue gas contained 0.1% sulfur dioxide. The active carbon of coal origin had the best desulfurization capacity.

The above-mentioned experiment was carried out without withdrawing to the outside of the reactor vessel sulfuric acid formed in the reactor vessel, but an experimental example of withdrawing the formed sulfuric acid will be given below. The experimental conditions were the same as for the afore-mentioned experiment. Active carbon having particle sizes of 0.14 to 0.26 mm was used, and water was used as the aqueous washing solution. The active carbon suspension was filled in the reactor vessel, and flue gas was passed through the reactor vessel. Sulfuric acid was formed in the active carbon suspension, and separated from active carbon and withdrawn from the reactor vessel. Water was supplemented by the volume corresponding to the withdrawn volume, and the sulfuric acid concentration of the active carbon suspension was kept constant, that is, at 6%. The percent desulfurization could be maintained at 92% for a long time.

Similar tendency to that of water can be obtained when sea water is utilized as an aqueous washing solution. One example of the experimental results is given in FIG. 1. The percent desulfurization obtained by using an active carbon suspension prepared by mixing particles of active carbon having particle sizes of 0.14 to 0.26 mm in sea water coincides with that obtained when water is used as the washing solution.

The present invention has been accomplished on the basis of the afore-mentioned experimental results. Most preferable embodiment of the present invention will be described later in detail. According to the present invention, absorbability of the washing solution towards sulfur dioxide is increased, as compared with the conventional wet desulfurization process, and further absorption of sulfur dioxide and formation of sulfates can be carried out in one vessel without providing an additional oxidation column. Furthermore, the particles of active carbon are stable against the sulfates, and a very small amount of active carbon can perform the required duty, as compared with the conventional dry desulfurization process. It is not always necessary to carry out absorption and regeneration of the active carbon in separate steps. Furthermore, the percent desulfurization can be controlled by adjusting the sulfuric acid concentration of the active carbon suspension according to the present invention. On the contrary, sulfuric acid of specific concentration can be obtained by keeping the percent desulfurization constant. The foregoing is the effects of the present invention.

Figure 5:
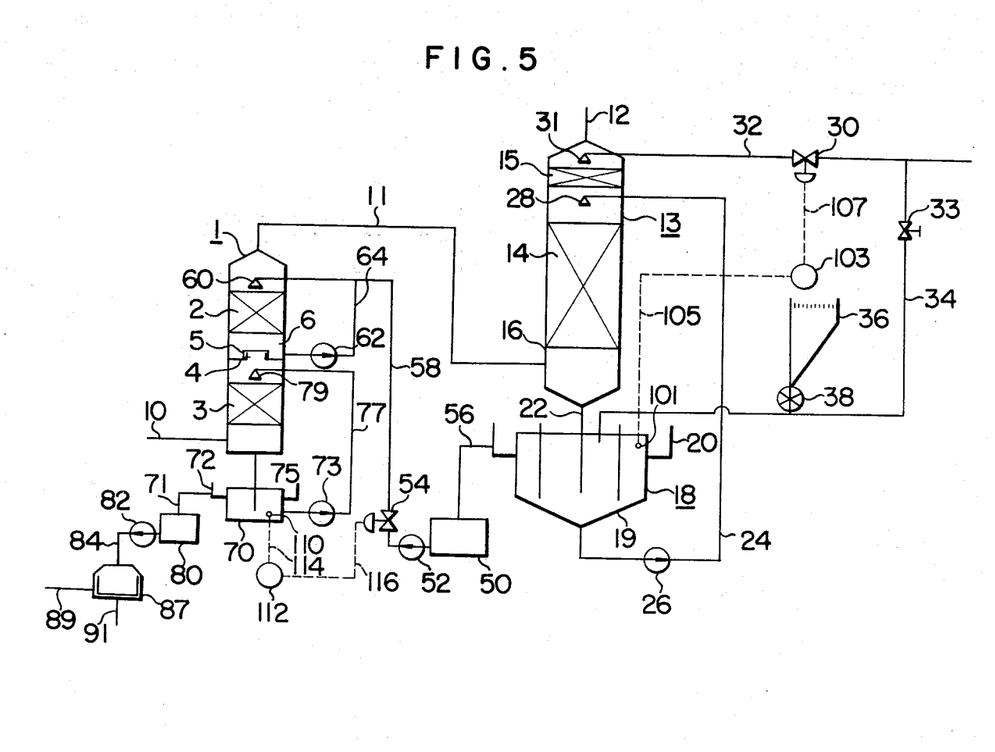
FIG. 5 is a flow diagram showing one embodiment of the present invention for purifying the flue gas with the active carbon suspension.

Most preferable embodiment for carrying out the present invention will be described below by way of FIG. 5.

An apparatus for desulfurizing flue gas according to the present invention, which will be hereinafter referred to as "desulfurization apparatus", consists of a concentration column 1 having packed layers 2 and 3 inside at two stages, each being filled with Raschig rings to a height of 1.5 m, a desulfurization column 13 having an absorption section 14 inside and a demister 15 provided above the absorption section through a space, and a separation tank 18 having an overflow receptacle 20 around the outer periphery of a separation vessel 19. A flue gas passage 10 communicating with a flue gas outlet (not shown in the drawing) of a combustion apparatus is connected to a lower part of the concentration column 1, that is, a side wall below the packed layer 3. Diameter of the concentration column 1 is 1.6 m. A partition plate 4 having a cylindrical part 3 at a center is provided between the packed layer 2 and the packed layer 3 within the concentration column 1. The packed layers 3 and 4 are communicated with each other through the cylindrical part 5. A recess 6 is formed by the side wall of the concentration column 1, the partition plate 4 and the cylindrical part 5. Sprays 60 and 79 are provided above the packed layer 2, and between the packed layer 3 and the partition plate 4, respectively. Acid-resistant lining is applied on the inside wall of the concentration column 1 to withstand hot sulfuric acid. A flue gas passage 11 is connected to the upper part of the concentration column 1, and further communicated with the lower part of a vessel 16 of the desulfurization column 13.

The diameter of the vessel 16 of the desulfurization column is 3 m. The absorption section 14 of the vessel 16 is of tray contactor type, and consists of three trays at distances of 0.7 m between one tray and another. For the absorption part 14, another contactor type may be used. That is, a packed column or a bubble cap type column can be used as the desulfurization column 13. Sprays 28 and 31 are provided at a space between the absorption section 14 and the demister 15, and above the demister 15, respectively. A flue gas passage 12 is connected to the upper part of the vessel 16 above the demister 15 and further communicated with a heating apparatus (not shown in the drawing). A down pipe 22 is provided at the bottom of the vessel 16, and guided to the separation tank 18. The lower end of the down pipe is inserted into the separation vessel 19. One end of a conduit 24 is connected to the bottom of the separation vessel 19, and another end thereof is connected to the spray 28 within the concentration column 13 through a circulating pump 26. A passage 32 for feeding washing solution is connected to the spray 31 within the concentration column 13 through a flow rate control valve 30. A detector end 101 is inserted into the separation tank 18 to detect sulfuric acid concentration. The detector end is connected to a controller 103 through a circuit 105, and further to the flow rate control valve 30 through a circuit 107. A passage 34 branched from the passage 32 for feeding the washing solution at an upstream side of the flow rate control valve 30 is connected to the separation vessel 19 through a valve 33. A storage tank 36 for active carbon is provided in the course of the passage 34 through a valve 38.

One end of a conduit 56 is connected to the overflow receptacle 20 of the separation tank 18, and another end thereof is guided to a tank 50. A conduit 58 connected to the tank 50 is successively connected to a pump 52 and a flow rate control valve 54, and finally to the spray 60 within the concentration column 1. A conduit 64 connected to the conduit 58 is connected to the recess 6 within the concentration column 1. In the conduit 64, a circulating pump 62 is provided. A down pipe 75 is provided at the bottom of the concentration column 1, and the lower end of the down pipe 75 is guided into a tank 70. One end of a conduit 77 is connected to a tank 70, and another end thereof is connected to the spray 79 within the concentration column 1 through a circulating pump 73. A detector end 110 is inserted into the tank 70 to detect a concentration of concentrated sulfuric acid. The detector end 110 is connected to a controller 112 through a circuit 114, and the controller 112 is connected to a pressure control valve 54 through a circuit 116. An overflow receptacle 72 is provided around the outer periphery of the tank 70. One end of a conduit 71 is connected to the overflow receptacle 72, and another end thereof is connected to a tank 80. The tank 80 is connected to a separator 87 through a conduit 84, and a pump 82 is provided in the circuit 84. A conduit 89 for discharging sulfuric acid and a conduit 91 for discharging impurities are provided at the separator 87.

Flue gas generated in the combustion equipment (not shown in the drawing) reaches the lower part of the concentration column 1 through the flue gas passage 10. Flow rate of the flue gas is 10,000 Nm³/hr, and its temperature is 150°C. The flue gas consists of 0.1% sulfur dioxide, 10% steam, 12% carbon dioxide, 5% oxygen and 72.9% nitrogen. The flue gas arriving at the lower part of the concentration column ascends through the packed layers 3 and 2 within the column, and reaches the desulfurization column 13 through the flue gas passage 11. When the flue gas ascends within the concentration column 1, the flue gas contacts sulfuric acid supplied from the sprays 60 and 79, and consequently the flue gas temperature is lowered. The flue gas leaving the concentration column 1 is cooled almost to a dew point temperature, that is, about 57°C. The water content of the flue gas is increased, on the other hand, to 15.7%.

The flue gas enters the desulfurization column 13 from its lower part, and ascends through the absorption section 14 of tray contactor type within the column. The flue gas contacts an active carbon suspension supplied from the spray 28 at that time, whereby sulfur dioxide of the flue gas is absorbed into the active carbon suspension. The active carbon suspension moves through the absorption section 14 from the top downward. The flue gas freed from sulfur dioxide passes through the demister 15 and then through the flue gas passage 12, and is discharged to the atmosphere after heating by the heating apparatus (not shown in the drawing). The demister 15 removes mists of sulfuric acid and active carbon suspension contained in the flue gas.

The active carbon suspension is a mixture of particles of active carbon in water as the aqueous washing solution. Particle sizes of the active carbon used are 0.14 to 0.26 mm. A ratio of the active carbon to water used is 10 kg per 100 l of water. When the active carbon suspension contacts the flue gas at the absorption section 14 within the desulfurization column 13, it absorbs sulfur dioxide. The percent desulfurization is about 90% at that time. The sulfur dioxide absorbed in the suspension fixes to the surfaces of particles of active carbon, and is oxidized to sulfur trioxide, as explained before. Further, sulfur trioxide is hydrated to sulfuric acid, and the resulting sulfuric acid diffuses into the active carbon suspension. Such a process for absorption of sulfur dioxide and successive formation of sulfuric acid is carried out in the active carbon suspension within the desulfurization column 13. The active carbon suspension containing sulfuric acid is led into the separation tank 18 from the desulfurization column 13 through the down pipe 22. The active carbon suspension containing sulfuric acid is separated into the particles of active carbon and the sulfuric acid solution by sedimentation in the separation tank 18. That is, the particles of active carbon settle down to the bottom of the separation vessel 19, and a portion of the sulfuric acid solution flows over the separation vessel 19 into the overflow receptacle 20. The sulfuric acid solution retained in the overflow receptacle 20 is led to the tank 50 through the conduit 56.

The particles of active carbon settled down at the bottom of the separation vessel 19 are led to the spray 28 through the conduit 24 by the circulating pump 26 together with the sulfuric acid solution of the separation vessel 19. The active carbon suspension containing sulfuric acid is again supplied into the the desulfurization column 13 from the spray 28. The active carbon suspension again contacts the flue gas at the absorption section 14, thereby absorbing sulfur dioxide. Further, a portion of sulfuric acid solution is separated in the separation tank 18, and the active carbon solution is again returned to the desulfurization column 13 through the conduit 24 by the circulating pump 26. The recycling is repeatedly carried out. By the repeated recycling of the active carbon suspension, the particles of active carbon are uniformly distributed, and thereby the absorption of sulfur dioxide is improved. However, by said repeated recycling, the water content of the suspension is reduced, and the sulfuric acid concentration is increased. To prevent the water content from the reduction, a sulfuric acid concentration within the separation vessel 19 is detected by the detector end 101. Detector signal emitted from the detector end 101 is transmitted to the controller 103 through the circuit 105. The controller 103 emits a signal for controlling the flow rate control valve 30 through the circuit 107 according to the detector signal. When the sulfuric acid concentration is increased within the separation vessel 19, the flow rate control valve opens to supply water into the desulfurization column 13 from the spray 31 through the passage 32 for supplying the washing solution. The supplied water is passed through the demister 15 and mixed into the active carbon suspension. When the supplied water is passed through the demister 15, mists of sulfuric acid and active carbon suspension caught on the demister 15 are washed out by the supplied water. In this manner, the sulfuric acid concentration within the separation tank 19 can be maintained constantly at 7% with the percent desulfurization of about 90%. The active carbon suspension is circulated at a rate of 20 m$^3$/hr, and the 7% sulfuric acid is withdrawn from the separation tank 19 at a rate of 563 kg/hr. At that time, water is supplemented at a rate of 524 kg/hr through the passage 32 for supplying the washing solution. By changing the rate of water to be supplemented, the sulfuric acid of the active carbon suspension can be adjusted as desired, and consequently the percent desulfurization can be changed.

The valve 33 is usually closed, but is opened when it is necessary to supplement the particles of active carbon to the suspension. The valve 38 is also opened at the same time when the valve 33 is opened. The particles of active carbon retained in the storage tank 36 for active carbon are supplied to the passage 34, and mixed into the active carbon suspension in the separation tank 18 by the water flowing through the passage 34.

The 7% sulfuric acid solution retained in the tank 50 is led to the spray 60 within the concentration column 1 through the conduit 58 by the pump 52. The sulfuric acid solution supplied from the spray 60 is passed through the packed layer 2. While the sulfuric acid solution is passed through the packed layer 2, the solution is concentrated to 22% sulfuric acid solution by the sensible heat of the flue gas coming from the combustion equipment (not shown in the drawing). The concentrated sulfuric acid solution is returned in the recess 6. A portion of the concentrated solution flows over a weir of the recess through the cylindrical part 5 of the partition plate 4, and reaches the top of the packed layer 3 at the lower stage. The sulfuric acid solution retained in the recess 6 is supplied to the conduit 58 through the conduit 64 by the circulating pump 62, and again supplied into the concentration column 1 from the sprayer 60. On the other hand, the 22% sulfuric acid solution supplied to the top of the packed layer 3 through the cylindrical part 5 again contacts the flue gas through the packed layer 3. While the sulfuric acid solution is passed through the packed layer 3, the solution is further concentrated to a 60% sulfuric acid solution. When the sulfuric acid solution is concentrated in the concentration column 1, the water content of the flue gas leaving the concentration column 1 is increased, as already described before. However, since the water contained in the flue gas leaving the concentration column 1 is in a saturated amount, the water contained in the flue gas is not recovered through contact with the active carbon suspension in the desulfurization column 13 and vented to the atmosphere, as it is.

The 60% sulfuric acid solution obtained in the concentration column 1 is led to the tank 70 through the down pipe 75. A portion of the sulfuric acid within the tank 70 flows into the overflow receptacle 72 and then into the tank 80 through the conduit 71. The sulfuric acid retained in the tank 70 is led to the spray 79 within the concentration column 1 through the conduit 77 by the circulating pump 73, and supplied to the top of the packed layer 3 from the spray 79. The rates of the sulfuric acid solutions recycled by the circulating pumps 62 and 73 are 14 m$^3$/hr in total. To keep the sulfuric acid concentration within the tank 70 constant, a detector end 110 is provided at the tank 70 for detecting the sulfuric acid concentration. Detector signal emitted from the detector end 110 is transmitted to the controller 112 through the circuit 114. The controller 112 emits an output signal according to the detector signal, and the output signal is transmitted to the flow rate control valve 54 through the circuit 116. The flow rate control valve 54 actuates opening or closing according to the output signal, and controls the flow rate of sulfuric acid to be supplied to the concentration column 1. On the other hand, the sulfuric acid solution retained in the tank 80 is led to the separator 87 through the conduit by the pump 82. In the separator 87, the sulfuric acid solution is separated from the impurities, and recovered through the conduit 89 for discharging sulfuric acid. The impurities are withdrawn through the conduit 91 for discharging impurities.

The present invention has been explained by way of the most preferable embodiment. In the embodiment, a ratio of the particles of active carbon to the aqueous washing solution can be made very small. That is, a total volume of the active carbon suspension charged in said equipment is 15 m$^3$, and 10 kg of the particles of active carbon is contained in 100 l of water. That is, a total weight of the particles of active carbon is about 1.5 tons, which is very small, as compared with the conventional dry desulfurization process, where it is necessary to use 5 to 10 tons of active carbon to obtain an equivalent percent desulfurization. Even if a ratio of the particles of active carbon to the aqueous washing solution is increased, the desulfurization capacity will be constant, when the ratio exceeds a specific limit value. As shown in FIG. 4, said specific limit value is about 20% (W/V). However, it is preferable to repress said ratio of the particles of active carbon to the aqueous washing solution to about 15% or less, when the active carbon suspension is recycled, as in the foregoing embodiment, because, if the ratio of the particles of active carbon exceeds about 15%, circulation of the active carbon suspension will be hard to effect; the particles of active carbon are liable to accumulate at pumps, valves and sprays; the state of suspension is liable to be deteriorated and as a result a rate of absorption of sulfur dioxide is lowered.

Even if the sulfur dioxide concentration of the flue gas is changed from 0.1 to 0.2% in the foregoing embodiment, a percent desulfurization of about 90% can be obtained by carrying out operations in the same manner as in the foregoing embodiment.

According to the present invention, an aqueous alkaline solution can be used as the aqueous washing solution in addition to water as used in the foregoing embodiment. According to the conventional process, where only an aqueous alkaline solution is used, most of sulfur dioxide absorbed in the desulfurization column remains as sulfites, and only a very small amount of sulfates is formed. According to the present invention, sulfur dioxide absorbed in the desulfurization column can be readily converted to sulfates in the same column by mixing the aqueous alkaline solution with the particles of active carbon.

What is claimed is:

1. A method for desulfurizing flue gas, comprising contacting a flue gas saturated with water and containing sulfur dioxide with an activated carbon suspension containing particles of activated carbon in an aqueous washing solution thereby absorbing the sulfur dioxide into said activated carbon suspension and forming a liquid containing sulfate ions at a low concentration in said activated carbon suspension, separating a portion of said liquid from said activated carbon suspension, and contacting said portion of liquid with fresh flue gas before said fresh flue gas contacts said activated carbon suspension thereby concentrating said portion of liquid containing sulfate ions at a low concentration and saturating said fresh flue gas with water before said fresh flue gas contacts said activated carbon suspension.

2. The method of claim 1, wherein said activated carbon suspension after said portion of said liquid is separated therefrom is recycled for contact with additional flue gas.

3. The method of claim 2, further comprising supplying additional aqueous washing solution to said activated carbon suspension to replace the portion of liquid separated therefrom.

4. The method of claim 3, wherein the flue gas saturated with water is contacted with said activated carbon suspension in a reaction zone, wherein said portion of liquid is separated from said activated carbon suspension in a separation zone, wherein the activated carbon suspension is circulated in a closed loop communicating with said reaction zone and with said separation zone, wherein said aqueous washing solution is supplied to the closed loop downstream of said separation zone.

5. The method of claim 4, wherein said flue gas after contact with said activated carbon suspension contains activated carbon particles and mists of said liquid containing the sulfate ions, said process further comprising removing said particles and mists from said flue gas by means of a demister, said aqueous washing solution contacting said demister as said aqueous washing solution is supplied to said activated carbon suspension whereby activated carbon particles and mists attached to the demister are removed therefrom.

6. The method of claim 3, wherein said activated carbon suspension contains not more than 20 grams activated carbon particles per liter of aqueous washing solution.

7. The method of claim 6, wherein the particles of activated carbon have particle sizes of 0.37 mm or less.

8. The method of claim 3, further comprising controlling the percent desulfurization by adjusting the concentration of sulfate ions in said activated carbon suspension.

9. The method of claim 8, wherein the sulfate ion concentration of the liquid containing sulfate ions in the activated carbon suspension is controlled by adjusting the rate of feeding said aqueous washing solution.

10. The method of claim 3, wherein said flue gas after contact with said activated carbon suspension contains activated carbon particles and mists of said liquid containing the sulfate ions, said process further comprising removing said particles and mists from said flue gas by means of a demister, said aqueous washing solution contacting said demister as said aqueous washing solution is supplied to said activated carbon suspension whereby activated carbon particles and mists attached to the demister are removed therefrom.

11. The method of claim 3, wherein said portion of liquid consists essentially of a dilute aqueous solution of sulfuric adic.

12. The method of claim 11, wherein said portion of liquid is contacted with sufficient flue gas so that the concentration of sulfuric acid therein increases to at least about 60%.

13. The method of claim 3, wherein said portion of liquid is contacted with sufficient flue gas so that the concentration of sulfuric acid therein increases to at least about 60%.

14. The method of claim 3, wherein the temperature and the flow rate of said flue gas are sufficient so that the sulfuric acid concentration of said portion of liquid contacted with the flue gas is increased up to at least about 60%.

15. The method of claim 14, wherein the temperature of the flue gas when contacted with said portion of liquid is about 150°C.

16. The method of claim 15, wherein said flue gas contains oxygen.

17. The method of claim 3, wherein said flue gas contains oxygen.

18. The method of claim 3, wherein the particle sizes of the activated carbon particles in said suspension are about 0.14 to 0.26 mm.

19. The method of claim 18, wherein said activated carbon suspension contains not more than 20 grams activated carbon particles per liter of aqueous washing solution.

20. The method of claim 1, wherein the particle sizes of the activated carbon particles in said suspension are about 0.14 to 0.26 mm.

21. The method of claim 20, wherein said activated carbon suspension contains not more than 20 grams activated carbon particles per liter of aqueous washing solution.

22. The method of claim 21, wherein said flue gas contains oxygen.

23. The method of claim 22, wherein the temperature and the flow rate of said flue gas are sufficient so that the sulfuric acid concentration of said portion of liquid contacted with the flue gas is increased up to at least about 60%.

24. The method of claim 23, wherein the temperature of the flue gas when contacted with said portion of liquid is about 150°C.

* * * * *